United States Patent
Shacklette et al.

[11] Patent Number: 5,974,214
[45] Date of Patent: Oct. 26, 1999

[54] RAISED RIB WAVEGUIDE RIBBON FOR PRECISION OPTICAL INTERCONNECTS

[75] Inventors: Lawrence W. Shacklette, Maplewood, N.J.; Gregory J. Sellers, Naperville, Ill.; Kelly M. T. Stengel, Maplewood, N.J.

[73] Assignee: AlliedSignal Inc., Morris Township, N.J.

[21] Appl. No.: 08/838,343

[22] Filed: Apr. 8, 1997

[51] Int. Cl.$^6$ .................................................. G02B 6/26
[52] U.S. Cl. .............................. 385/50; 385/14; 385/49; 385/51; 385/52; 385/95; 385/97; 385/98; 385/88; 385/89; 385/132; 385/114
[58] Field of Search ................... 385/14, 49, 50, 385/51, 52, 53, 95, 97, 98, 88, 89, 130, 132, 114

[56] References Cited

U.S. PATENT DOCUMENTS

| | | | |
|---|---|---|---|
| 4,609,252 | 9/1986 | Wong et al. | 350/96.12 |
| 5,024,505 | 6/1991 | Junji et al. | 385/49 X |
| 5,061,029 | 10/1991 | Ishikawa | 385/132 |
| 5,136,678 | 8/1992 | Yoshimura | 385/132 |
| 5,136,682 | 8/1992 | Moyer et al. | 385/141 |
| 5,265,184 | 11/1993 | Lebby et al. | 385/132 |
| 5,309,537 | 5/1994 | Chun et al. | 385/59 |
| 5,325,451 | 6/1994 | Hartman et al. | 385/49 |
| 5,367,593 | 11/1994 | Lebby et al. | 385/53 |
| 5,375,184 | 12/1994 | Sullivan | 385/129 |
| 5,390,275 | 2/1995 | Lebby et al. | 385/132 |
| 5,515,464 | 5/1996 | Sheem | 385/49 |

FOREIGN PATENT DOCUMENTS

| | | | |
|---|---|---|---|
| 0 388 642 A2 | 2/1990 | European Pat. Off. | G02B 6/36 |
| 0 606 552 A1 | 11/1993 | European Pat. Off. | G02B 6/12 |
| 0721 122 A1 | 11/1995 | European Pat. Off. | G02B 6/30 |

OTHER PUBLICATIONS

PCT Notification of Transmittal of the International Search Report.
PCT Demande International Publiee en Vertu du Traite de Cooperation en Metiere de Brevets (PCT).

*Primary Examiner*—Brian Healy
*Attorney, Agent, or Firm*—John A. Squires; Colleen D. Szuch

[57] ABSTRACT

The invention provides a waveguide connector assembly for the precision interconnection of mating arrays of parallel optical waveguides which are preferably photolithographically formed on substrates. The connector assembly has a base with several parallel channel walls cut along a surface of the base. A waveguide assembly is positioned on the base. The waveguide assembly comprises a substrate and several transparent, polymeric waveguides on and raised from a surface of the substrate. The waveguides have a polygonal cross section with flat edges. The waveguide assembly is positioned on the base such that each of the waveguides is set in one of the channels and contacts the walls of the channel at two or more points. A cover plate holds the waveguide assembly on the base.

30 Claims, 6 Drawing Sheets

RAISED RIB WAVEGUIDE RIBBON FOR PRECISION OPTICAL INTERCONNECTS

BACKGROUND OF THE INVENTION

The present invention relates to waveguides, or more particularly to a connector assembly for the precision interconnection of mating arrays of parallel optical waveguides. The optical waveguides are preferably photolithographically formed on substrates.

It is known in the art to photolithographically produce optical waveguides on a substrate. Such optical waveguides connect optical information processing devices or connect such devices and other optical communication links such as glass optical fibers. Waveguides may also be used to create passive optical devices such as splitters, combiners, couplers, routers and the like. In commonly used applications, waveguides are densely packed on substrates and extremely small dimensions are generally required. The transverse dimension of such waveguides typically range from about 5 $\mu$m to about 100 $\mu$m, while the space between guides can be as little as 3 $\mu$m. It is known in the art to produce waveguides with UV photopatterned polymeric materials. In this regard, see U.S. Pat. No. 4,609,252 which is incorporated herein by reference. It is often necessary to make an optical interconnection between waveguides having approximately rectangular cross-section and other waveguides, devices and/or optical fibers. These interconnections require a precision alignment at the interface between the devices. This is difficult to achieve when the device structures have different geometries. Moreover, no matter how well made, such interconnects result in loss of optical power. A further complication is that the alignment, once accomplished, is difficult to maintain under conditions of high vibration. It is therefore generally desired to minimize the number of interconnects, to facilitate the precision alignment at any necessary interconnects and to ensure the maintenance of alignment over time.

The present invention provides a raised rib structure which allows the precision alignment of a waveguide array with another corresponding waveguide array or light transmitting device having a raised rib configuration or fiber array. Such a raised rib structure serves as an optical interconnect between light transmitting devices. The device may be a printed waveguide structure which, when fabricated on a flexible substrate may include a flexible ribbon-type interconnect which can be run directly to a connector or to another device. The device itself may be laminated to a rigid structure such as a sheet of rigid plastic or glass with the flexible ribbon interconnects allowed to extend beyond the substrate and which can be fed to an optical connector or other interface between devices.

U.S. Pat. No. 4,111,522 discloses the alignment of glass fibers in a fiber-to-fiber connector. The foregoing does not suggest the aligned attachment of photolithographically formed waveguides on substrates nor a de-mateable connector for the interfacing of standing rib waveguide to conventional glass or polymer fiber. U.S. Pat. No. 5,375,184 shows a waveguide alignment device wherein a single waveguide is aligned with another single waveguide by means of mating guides. U.S. Pat. No. 5,024,505 shows a splicer for several individual strands of circular cross-section optical fibers.

It would be desirable to provide a means of connecting two or more ribbons of densely packed, small diameter, substantially parallel, photolithographically formed waveguides, especially rectangular cross-section waveguides on substrates. It has now been found that a good optical connection between waveguides can be achieved by mating the ends of waveguides to be connected in the base portion of a coupler having precision grooves. The ends of the waveguides are self-aligned by abutting them against the walls of the grooves. Once aligned, a cover plate maintains them in place.

DESCRIPTION OF THE INVENTION

Figure 1A:
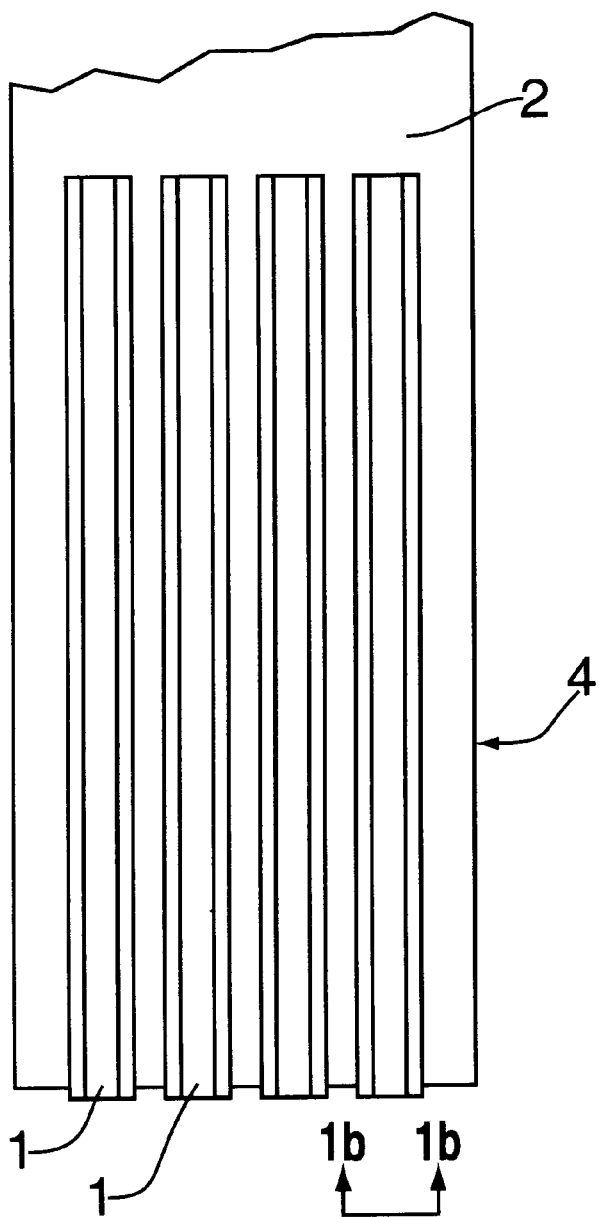
FIG. 1(a) shows a cross sectional view of a ribbon of raised rib waveguides.

The invention provides a waveguide connector assembly which comprises (a) a base having a plurality of substantially parallel channels defined by walls cut along a surface of the base;

(b) a waveguide assembly which comprises a substrate, and a plurality of substantially transparent, polymeric waveguides attached on and raised from a surface of the substrate, said waveguides having a polygonal cross section defined by a plurality of substantially flat edges; the waveguide assembly being positioned on the base such that each of the waveguides is positioned in one of the channels and contacts the walls of the channel at two or more points;

(c) a cover plate on the waveguide assembly.

The invention also provides a method for aligning a first waveguide assembly to a second waveguide assembly which comprises (a) providing a waveguide connector comprising a base having a plurality of substantially parallel channels defined by walls cut along a surface of the base and a cover plate on the base over the channels;

(b) providing first and second waveguide assemblies, each of which comprises a substrate, and a plurality of substantially transparent, polymeric waveguides attached on and raised from a surface of the substrate, said waveguides having a polygonal cross section defined by a plurality of flat edges;

(c) positioning the first and second waveguide assemblies on the base such that each of the waveguides is positioned in one of the channels and contacts the opposing walls of the channel at two or more points, and such that each of the waveguides on the first waveguide assembly has an end which is aligned with a corresponding end of a waveguide on the second waveguide assembly.

The invention further provides a method for aligning a waveguide assembly to an optical fiber assembly which comprises (a) providing a waveguide connector comprising a base having a plurality of substantially parallel channels defined by walls cut along a surface of the base and a cover plate on the base over the channels;

(b) providing a waveguide assembly which comprises a substrate, and a plurality of substantially transparent, polymeric waveguides attached on and raised from a surface of the substrate, said waveguides having a polygonal cross section defined by a plurality of flat edges;

(c) providing an optical fiber assembly which comprises a plurality of attached optical fibers;

(d) positioning the waveguide assembly and the optical fiber assembly on the base such that each of the waveguides and optical fibers is positioned in one of the channels and contacts the opposing walls of the channel at two or more points, and such that each of the waveguides on the waveguide assembly has an end which is aligned with a corresponding end of an optical fiber on the optical fiber assembly.

The invention also provides a method for aligning a first waveguide assembly to a second waveguide assembly which comprises (a) providing first and second waveguide connectors each comprising a base having a plurality of substantially parallel channels defined by walls cut along a surface of the base and a cover plate on the base over the channels;

(b) providing first and second waveguide assemblies, each of which comprises a substrate, and a plurality of substantially transparent, polymeric waveguides attached on and raised from a surface of the substrate, said waveguides having a polygonal cross section defined by a plurality of flat edges;

(c) positioning the first and second waveguide assemblies respectively on the base of the first and second waveguide connectors such that each of the waveguides is positioned in one of the channels and contacts the opposing walls of the channel at two or more points; and (d) attaching the first waveguide connector to the second waveguide connector such that each of the waveguides on the first waveguide assembly has an end which is in substantially co-linear alignment with a corresponding end of a waveguide on the second waveguide assembly.

The invention still further provides a method for aligning a first waveguide assembly to a plurality of optical fibers, which optical fibers are attached to one another, which comprises (a) providing first and second waveguide connectors each comprising a base having a plurality of substantially parallel channels defined by walls cut along a surface of the base and a cover plate on the base over the channels;

(b) providing a waveguide assembly which comprises a substrate, and a plurality of substantially transparent, polymeric waveguides attached on and raised from a surface of the substrate, said waveguides having a polygonal cross section defined by a plurality of flat edges;

(c) providing an optical fiber assembly which comprises a plurality of attached optical fibers;

(d) positioning the waveguide assembly respectively on the base of the first waveguide connector such that each of the waveguides is positioned in one of the channels and contacts the opposing walls of the channel at two or more points;

(e) positioning the optical fiber assembly respectively on the base of the second waveguide connector such that each of the optical fibers is positioned in one of the channels and contacts the walls of the channel at two or more points; and (f) attaching the first waveguide connector to the second waveguide connector such that each of the waveguides on the waveguide assembly has an end which is in substantially co-linear alignment with a corresponding end of an optical fiber on the optical fiber assembly.

The optical waveguide assembly of the invention comprises one or more waveguides which are, for example, photolithographically fabricated on the surface of a substrate. Illustrative of such devices are planar optical slab waveguides, channel optical waveguides, rib waveguides, optical couplers, micro-optical elements and the like which are described in more detail in U.S. Pat. Nos. 4,609,252; 4,877,717; 5,136,682; 5,481,385; 5,462,700; 5,396,350 and 5,428,468. All of the foregoing patents are incorporated herein by reference. Rib waveguides are preferred in the practice of this invention.

In general, waveguides are formed by applying a thin or thick film of a photopolymerizable composition onto the surface of a suitable substrate. The waveguide is composed of any material which is transparent to light in the wavelength range of interest for the specific application, such wavelengths of importance lie from about 400 nm to about 1550 nm. Transparency preferably means absorption of less than about 1 dB/cm, more preferably less than about 0.2 dB/cm and most preferably less than about 0.1 dB/cm. The substrate may be any material on which it is desired to establish a waveguide.

Substrates may vary widely and can be fabricated from any rigid, semi-rigid or flexible material. Preferably the substrate material is flexible and in such case is composed of a flexible polymer film. Polymers of choice may be any polymer capable of forming a free-standing film such as polyolefins, polyesters, polycarbonates, polyimides, polyetherimides, polysulfones, polyethersulfones, polyphenylene sulfide, nylons, and the like. Preferred substrates are dimensionally stable under environmental conditions and possess a surface energy greater than about 35 dynes/cm and more preferably greater than about 40 dynes/cm. Such preferred polymers include polyesters, such as polyethylene terephthalate and polyethylene naphthalate, and polyimides such as those marketed by DuPont as Kapton®. Useful substrates also include semiconductor materials such as silicon, silicon oxide, gallium arsenide, silicon nitride, glass, quartz, ceramics, crystalline materials and the like. On substrates where the light transmissive region is an organic layer of lower refractive index than the substrate material, it is necessary to first form a layer of material having a refractive index lower than the refractive index of the organic waveguide material. Such a layer is known in the art as a buffer layer and may be comprised of, for example, a semiconductor oxide, a lower refractive index polymer or a spin-on silicon dioxide glass material. The buffer layers are transparent and have lower refractive index than the waveguide and are preferably composed of a polymer or polymer blend which is chemically similar to the polymer chosen for the waveguide. The buffer serves to reflect light back into the waveguide. When the chosen substrate meets these requirements itself, a separate buffer layer can be eliminated. One preferred method of preparation of the buffer layer material is to add a small amount of an additional polymer of lower index than the waveguide to the polymer which comprises the waveguide material. In the case that the core material is a polymer blend or mixture of polymers of different refractive index, the buffer material may be prepared by increasing the relative amount of the lower index component in the blend or mixture. Buffer layers are preferably applied so that they form a smooth (surface roughness preferably less than 1 micron and more preferably less than 0.1 micron) and flat upper surface upon which the waveguide core structure can subsequently be formed. It can be applied uniformly over the surface of the substrate or it may be patterned, for example by photolithographic techniques, to form discrete plateaus upon which the waveguide core can be built.

The photopolymerizable composition comprises a photopolymerizable compound and a photoinitiator. The photopolymerizable compound may be a monomer, oligomer or polymer which is an addition polymerizable, nongaseous, ethylenically unsaturated compound containing at least one terminal ethylenically unsaturated group, and being capable of forming a high molecular weight polymer by free radical initiated, chain propagating addition polymerization. Such are well known in the art. In the preferred embodiment, at least one of said polymerizable compounds contains at least two ethylenically unsaturated groups. The waveguide is preferably composed of a transparent polymer or polymer blend such as an acrylate, a methacrylate, an epoxy, a polyimide, a polyetherimide, or fluorinated derivatives of the same. Especially preferred for the embodiments of this invention are acrylates.

Suitable for use as polymerizable components are ethers, esters and partial esters of acrylic and methacrylic acid and of aromatic and aliphatic polyols containing preferably 2 to 30 carbon atoms, or cycloaliphatic polyols containing preferably 5 or 6 ring carbon atoms. The partial esters and esters of polyoxaalkylene glycols are also suitable. Examples are ethylene glycol dimethacrylate, diethylene glycol dimethacrylate, triethylene glycol dimethacrylate, tetraethylene glycol dimethacrylate, polyethylene glycol dimethacrylates having an average molecular weight in the range from 200 to 2000, ethylene glycol diacrylate, diethylene glycol diacrylate, triethylene glycol diacrylate, tetraethylene glycol diacrylate, polyethylene glycol diacrylates having an average molecular weight in the range from 200 to 2000, trimethylolpropane ethoxylate trimethacrylate, trimethylolpropane polyethoxylate trimethacrylates having an average molecular weight in the range from 500 to 1500, trimethylolpropane ethoxylate triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethylacrylate, 1,3-butanediol dimethacrylate, sorbitol triacrylate, sorbitol tetraacrylate, sorbitol tetramethacrylate, sorbitol pentaacrylate, sorbitol hexaacrylate, oligoester acrylates, oligoester methacrylates, glycerol di- and triacrylate, 1,4-cyclohexane diacrylate, bisacrylates and bismethacrylates of polyethylene glycols having an average molecular weight from 100 to 1500, ethylene glycol diallyl ether, 1,1,1-trimethylolpropane triallyl ether, pentaerythritol triallyl ether, diallyl succinates and diallyl adipates or mixtures of the above compounds. Preferred multifunctional acrylate oligomers include, but are not limited to acrylated epoxies, acrylated polyurethanes and acrylated polyesters. Preferred photopolymerizable compounds are aryl acrylates and aryl methacrylates. Illustrative of such aryl acrylate monomers are aryl diacrylates, triacrylates and tetraacrylates as for example di, tri and tetraacrylates based on benzene, naphthalene, bisphenol-A, biphenylene, methane biphenylene, trifluoromethane biphenylene, phenoxyphenylene and the like. The preferred aryl acrylate monomers are multifunctional aryl acrylates and methacrylates and more preferred aryl acrylate monomers are di, tri and tetra acrylates and methacrylates based on the bisphenol-A structure. Most preferred aryl acrylate monomers are alkoxylated bisphenol-A diacrylates and dimethacrylates such as ethoxylated bisphenol-A diacrylate and dimethacrylates, propoxylated bisphenol A diacrylates and dimethacrylates and ethoxylated hexafluorobisphenol-A diacrylates and dimethacrylates. The aryl acrylate monomers of choice are ethoxylated bisphenol-A diacrylate and dimethacrylates. Also useful are acrylate and methacrylate containing copolymers which are well known in the art.

The photopolymerizable compound is present in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light transmissive element of light transmissive devices may be used. The amount of photopolymerizable compound is usually from about 35 to about 99.9% by weight of the composition. In the preferred embodiment, the photopolymerizable compound is present in the overall composition in an amount of from about 80% to about 99.5% by weight, preferably from about 95 to about 99.5% based on the weight of the overall composition.

The composition further comprises at least one free radical generating photoinitiator which photolytically generates free radicals. Free radical liberating photoinitiators include any compounds which liberate free radicals on stimulation by actinic radiation. Usually the photoinitiator is a free radical generating addition polymerization initiator activated by actinic light and is preferably thermally inactive near room temperature (e.g. from about 20° C. to about 30° C.) Preferred photoinitiators nonexclusively include those described in U.S. Pat. No. 4,942,112, quinoxaline compounds as described in U.S. Pat. No. 3,765,898; the vicinal polyketaldonyl compounds in U.S. Pat. No. 2,367,660; the alpha-carbonyls in U.S. Pat. Nos. 2,367,661 and 2,367,670; the acyloin ethers in U.S. Pat. No. 2,448,828; the triarylimidazolyl dimers in U.S. Pat. No. 3,479,185; the alpha-hydrocarbon substituted aromatic acyloins in U.S. Pat. No. 2,722,512; polynuclear quinones in U.S. Pat. Nos. 2,951,758 and 3,046,127; and s-triazines in U.S. Pat. No. 4,656,272 all of which are incorporated herein by reference. Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3- benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Preferred free radical initiators are 1-hydroxy-cyclohexyl-phenyl ketone (Irgacure 184), benzoin, benzoin ethyl ether, benzoin isopropyl ether, benzophenone, benzodimethyl ketal (Irgacure 651), α,α-diethyloxy acetophenone, α,α-dimethyloxy-α-hydroxy acetophenone (Darocur 1173), 1-[4-(2-hydroxyethoxy)phenyl]-2-hydroxy-2-methyl-propan-1-one (Darocur 2959), 2-methyl-1-[4-methylthio) phenyl]-2-morpholino-propan-1-one (Irgacure 907), 2-benzyl-2-dimethylamino-1-(4-morpholinophenyl)-butan-1-one (Irgacure 369), poly{1-[4-(1-methylvinyl)phenyl]-2-hydroxy-2-methyl-propan-1-one} (Esacure KIP), [4-(4-methylphenylthio)phenyl]phenylmethanone (Quantacure BMS), di-campherquinone. The most preferred photoinitiators are those which tend not to yellow upon irradiation. Such photoinitiators include benzodimethyl ketal (Irgacure 651), α,α-dimethyloxy-α-hydroxy acetophenone (Darocur 1173), 1-hydroxycyclohexyl-phenyl ketone (Irgacure-184), and 1-[4-(2-hydroxyethoxy)phenyl]-2-hydroxy-2-methyl-propan-1-one (Darocur 2959).

The free radical generating photoinitiator is present in an amount sufficient to effect photopolymerization of the photopolymerizable compound upon exposure to sufficient actinic radiation. The photoinitiator may comprise from about 0.01% to about 10% by weight of the overall composition, or more preferably from about 0.1% to about 6% and most preferably from about 0.5% to about 4% by weight based on the total weight of the composition.

Various optional additives may also be added to the composition depending on the purpose and the end use of the light sensitive composition. Examples of these include antioxidants, photostabilizers, volume expanders, fillers such as for example silica, glass spheres and the like, dyes, free radical scavengers, contrast enhancers and UV absorbers. Antioxidants include such compounds as phenols and particularly hindered phenols including Irganox 1010 from Ciba-Geigy; sulfides; organoboron compounds; organophosphorous compounds; N,N'-hexamethylenebis(3,5-di-tert-butyl- 4-hydroxyhydrocinnamamide) available from Ciba-Geigy under the tradename "Irganox 1098". Photostabilizers and more particularly hindered amine light stabilizers include but are not limited to poly[(6-morpholino-s-triazine-2,4-diyl)[2,2,6,6,-tetramethyl-4-piperidyl)imino]-hexamethylene[2,2,6,6,-tetramethyl-4-piperidyl)imino)] available from Cytec Industries under the tradename Cyasorb UV3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers. UV absorbers include benzotriazole, hydroxybenzophenone, and the like. These additives may be included in quantities, based upon the total weight of the composition, from about 0% to about 6%, and preferably from about 0.1% to about 1%. Preferably all components of the overall composition are in admixture with one another, and most preferably in a substantially uniform admixture.

The film of photopolymerizable composition may be applied to the substrate by any of a number of methods known in the art, such as spin coating, dip coating, slot coating, roller coating, doctor blading, evaporation or the like. Once the photopolymerizable composition is formed onto the substrate in a thin or thick film, actinic radiation is directed onto the film in order to delineate the light transmissive region. That is, the position and dimensions of the light transmissive device is determined by the pattern of the actinic radiation upon the surface of the film on the substrate. The radiation pattern must be chosen so that the photopolymerizable composition is polymerized in the desired pattern and so that other regions of the film remain unreacted.

The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art. Sources of actinic radiation and the wavelength of the radiation may vary widely, and any conventional wavelengths and sources can be used. It is preferable that the photochemical excitation be carried out with relatively short wavelength (or high energy) radiation so that exposure to radiation normally encountered before processing (e.g., room lights) will not prematurely polymerize the polymerizable material. Alternatively, the processing can utilize a multiphoton process initiated by a high intensity source of actinic radiation such as a laser. Thus, exposure to ultraviolet light (300–400 nm wavelength) is convenient. Also, exposure by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Electron beam or ion beam excitation may also be utilized.

Control of the spatial profile of the actinic radiation, that is, where it falls on the layer of photopolymerizable material may be achieved by conventional methods. For example, in one conventional method, a mask bearing the desired light transmissive pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the light transmissive pattern onto the film. Another conventional method of spatial control is to use a source of actinic radiation which comprises a directed or focused beam such as a laser or electron beam. Such a beam intersects only a small area of the photo-polymerizable material film surface. The pattern of the desired light transmissive regions is achieved by moving this small intersection point around on the film surface either by scanning the beam in space or by moving the substrate so that the intersection point is changed relative to a stationary beam. These types of exposure using a beam source are known in the art as direct-write methods. By choosing the spatial characteristics of irradiation, it is possible to create light transmissive regions on the surface of the substrate and produce raised waveguides.

By using a suitable mask and by controlling the degree of collimation of the actinic radiation used for exposure, it is also possible to create arrays of micro-optical waveguide elements which transmit light in a direction parallel to the substrate. For such application it is important to create an essentially cosmetically perfect device composed of individual elements which have sharp definition and smooth walls. The composition of the current invention can be used to enhance the critical aspects of definition and wall smoothness. After the photopolymerizable composition has been polymerized to form the predetermined pattern of the photopolymer on the surface of the substrate, the pattern is then developed to remove the nonimage areas and leave behind the predetermined pattern. Any conventional development method can be used, for example, flushing with a solvent for the unirradiated composition. Such solvents include polar solvents, such as alcohols and ketones. The most preferred solvents are acetone, methanol, tetrahydrofuran and ethyl acetate. The remaining pattern on the substrate is the transparent waveguide or waveguides. Other suitable methods of fabricating rib waveguides are through molding, casting or embossing. A mold or embossing roll having an appropriately grooved surface can be used to fabricate a rib waveguide from a variety of plastics including thermoplastics, thermosets, and photopolymerizable materials.

This invention has application in either multimode or single-mode waveguides. Multimode guides are typically between about 50 microns and 1 mm in lateral dimension, and most commonly between about 50 microns and 100 microns. Single-mode guides are typically between about 4 and about 10 microns in lateral dimension. Guides may have any of a number of convenient cross-sectional shapes, such as circular, square, rectangular, trapezoidal, and rounded such as following a parabolic or Gaussian curve on the top and flat at the bottom where they contact the substrate or buffer.

For purposes of this invention, a waveguide assembly is defined to mean an array of optical waveguides formed on a substrate. The invention contemplates a connector and method whereby two waveguide assemblies are optically connected or whereby such a waveguide assembly is optically connected to an array of optical fibers. A preferred embodiment of the invention is shown in FIG. 1(a) which depicts an optical waveguide assembly or ribbon 4 consisting of four parallel waveguides 1 which are raised from a substrate 2 by optional underlying plateaus 3. In the preferred embodiment the waveguides 1 are fabricated on or within substrate structure 2.

Figure 1B:
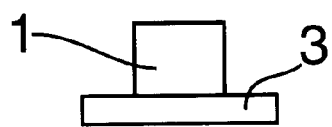
FIG. 1(b) shows an enlarged view of a single waveguide formed on a plateau.

When a plateau is employed, it may be lithographically formed in a manner described above for the formation of the waveguides. In such a case, the waveguide is formed on the plateau after the plateau is formed on the substrate. It is preferred that each waveguide be positioned on its own discrete plateau as shown in FIG 1(b). The waveguide is precision aligned with the raised plateau, preferably to a precision within about 10% of the width of the waveguide, more preferably within about 5% and most preferable within about 1%. The raised plateau may be separate from and parallel to each of the waveguides but is preferably an integral mechanical part of each waveguide itself. When the waveguide is formed on the plateau, the plateau preferably comprises a transparent polymer with an index of refraction which is less than that of the waveguide, such that light traveling within the waveguide remains confined within the waveguide. The alignment features of such a waveguide assembly consist of the sides of the plateaus and/or the sides of the waveguides. The alignment of the waveguides is critical and requires that the ribbon be fabricated in a way which assures that the waveguides are well aligned (e.g., centered) on their respective plateaus. For a multimode waveguide with a diameter in the range from 50 to 100 microns, the alignment of the plateau with the waveguide is preferably less than about 10 microns, and is more preferably less than about 5 microns. In the preferred embodiment, the substrate 2 is composed of a flexible material such as a polymer film. Suitable polymeric films non-exclusively include those described above. In this case the structure can be flexed and bent as desired to achieve the necessary orientation for interconnection with another device.

Figure 2A:
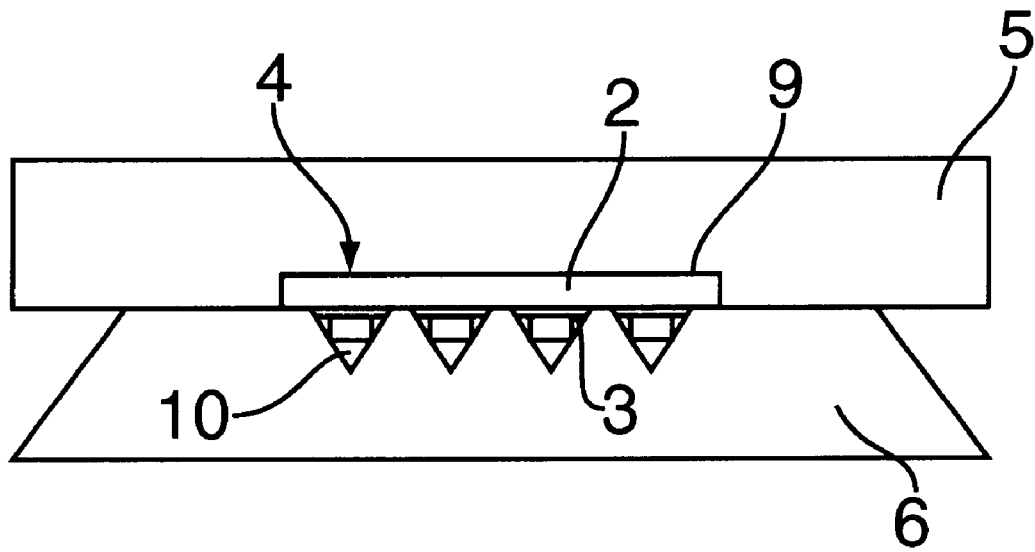
FIG. 2(a) shows one embodiment of a waveguide ribbon with discrete plateaus inserted into a connector alignment fixture.

An example of the utility of this invention in achieving an accurate alignment for a prospective interconnection is shown in FIG. 2(a). In this case a waveguide assembly or ribbon of waveguides 4 is positioned in a connector which includes a grooved micro-machined fixture or bench 6, which together with a slotted cover piece 5 forms a cavity comprising a series of etched grooves 10 into which the waveguide ribbon 4 is inserted. The optical bench fixture comprises a base with a series of parallel groves which match the number ($\geq 2$) and the spacing of the waveguides in the ribbon. The optical bench is formed by grooving or notching a rigid or semi-rigid material with precisely placed channels where for multimode applications the perpendicular distance between adjacent channels is held to at least 5 microns within specification and preferable to within 1 micron or less of specification, and for single mode applications is held to at least 1 micron within specification and preferable to within 0.1 micron or less. Material from which the optical bench is fabricated can vary widely and can comprise glass, plastics, metals, ceramics, and semiconductors. A preferred material is single-crystal silicon. Such a material can be masked and etched by conventional techniques to produce the required precisely placed channels. Lateral alignment within the fixture is achieved by contacting the sides of the plateaus and/or the sides of the waveguides with the sloping walls of the etched grooves 10. Vertical alignment is achieved by the constraint of the substrate 2 between the bench 6 and the cover plate 5. The vertical alignment of the waveguide, which is critical, is achieved by controlling the height (thickness) of the waveguide or plateau with the surface of the bench as a reference. Lateral alignment is ensured by the waveguide or the plateau having a height and width such that the edge of either or both just touch the wall of the groove in the bench. It is preferred that either the plateau or the waveguide be undersized with respect to their width such that only one will serve as the alignment feature. For the V-grooved optical bench shown in FIG. 2(a) it is necessary to control both the height and the width of the feature which is controlling the alignment function (plateau or waveguide). In one embodiment of the invention, the waveguide assembly is positioned in the grooves 10 of bench 6 and then cover plate 5 is attached on top. In another embodiment, bench 6 and cover plate 5 are pre-bonded or are a single piece monolithic construction and grooves and cover plate slot 9 are milled out, molded, or the like. The waveguide assembly is then slid into the grooves 10 and slot 9. It is preferable that the waveguides and the plateaus, if present, are comprised of a flexible material which can deform slightly to conform with the precisely aligned grooves of the bench. In such event, small errors in the positioning of the waveguides, and their plateaus can be corrected. Covers for the optical bench are optionally employed to form a rectangular cross-section channel into which the waveguide ribbon may be inserted. Covers may be fabricated from any of a number of rigid materials such as glass, plastics, metals, ceramics, and semiconductors. The preferred material for the cover is clear glass, which can be conveniently bonded directly to the silicon optical bench. The required channel in the cover, depending on the choice of material, can be formed by a variety of techniques such as extruding, molding, embossing, grinding, milling and cutting. When the cover is glass, the preferred method for forming the channel is grinding.

Figure 2B:
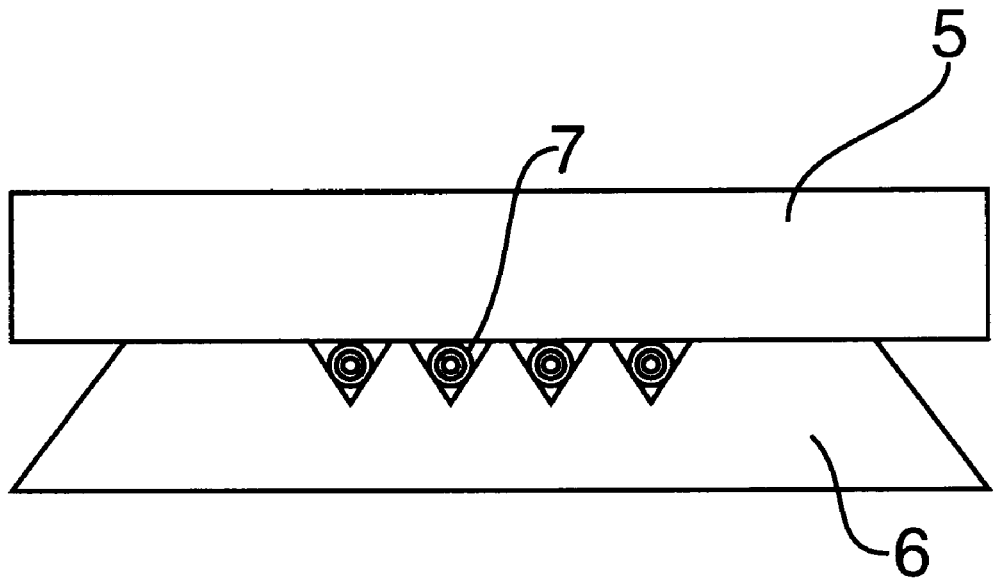
FIG. 2(b) shows another embodiment of a waveguide ribbon inserted into a connector alignment fixture.
Figure 6:
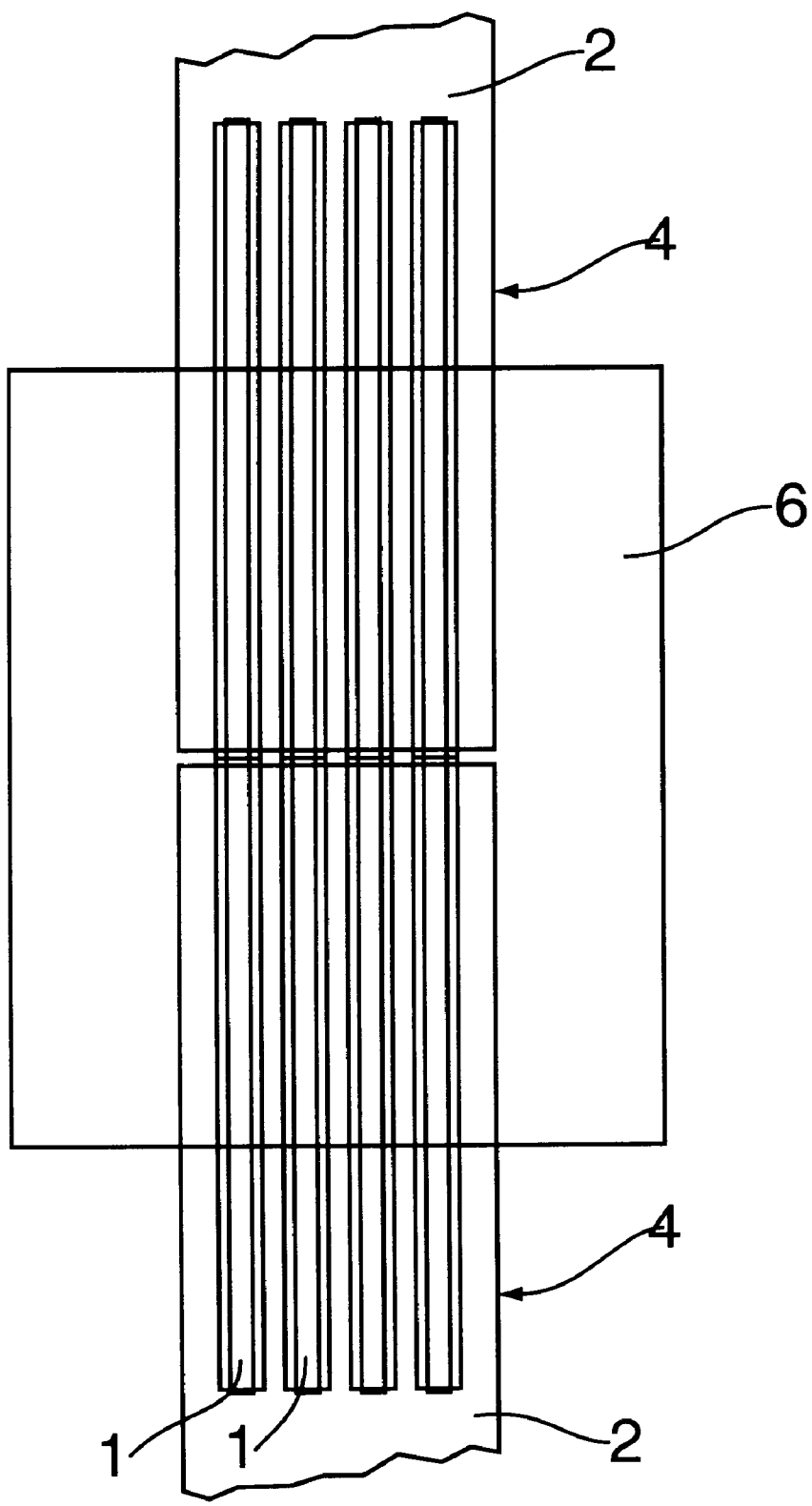
FIG. 6 shows two waveguide ribbons spliced together in a single connector.

In one embodiment of the invention, as shown in FIG. 6, two waveguide assemblies can be spliced together. A first waveguide assembly can be spliced to a second waveguide assembly by closely positioning the ends of each of the waveguides on one waveguide assembly to those of corresponding ends of the waveguides of another waveguide assembly in the grooves and slot between a single bench and cover. In another embodiment, the waveguide assembly can be spliced in a similar fashion to a plurality of optical fibers. FIGS. 2 through 4 show different embodiments of a bench and cover plate both with a waveguide assembly and a series of optical fibers. When it is desired to interface the waveguide with a glass or polymer fiber 7 within the two halves of the connector as shown in FIG. 2(b), it is advantageous, in order to minimize interconnection losses, to match the numerical aperture (NA) of the waveguide to that of the glass fiber. Conventional multi-mode glass fiber generally possess a numerical aperture (NA) near either 0.22 or 0.29. If $n_1$ is the index of refraction of the waveguide core and $n_2$ is the index of the cladding and the buffer, then the NA equals $(n_1^2-n_2^2)^{1/2}$. For a given value of $n_1$ the formulations for the cladding and the buffer polymers are adjusted to give a value of $n_2$ which leads to the desired NA.

Final assembly of the device requires insertion of the completed waveguide ribbon into the alignment fixture (optical bench and cover), preferably followed by adhesively bonding the ribbon within the fixture. The bonding may be accomplished by providing a "glue hole" through the cover and adding glue through this hole once the ribbon has been inserted. In this method the adhesive contacts the substrate and the cover and does not migrate to the waveguide side. It may, in some instances, be advantageous to apply adhesive to the waveguides themselves before insertion. In this case if the waveguides do not possess a separate cladding, then the adhesive itself will fill this function and must then meet the materials requirements of a cladding, that is, the index of refraction of the adhesive ($n_2$) should preferably be less than that of the waveguide ($n_1$) and more preferably be such it produces a waveguide with the desired NA.

Figure 5:
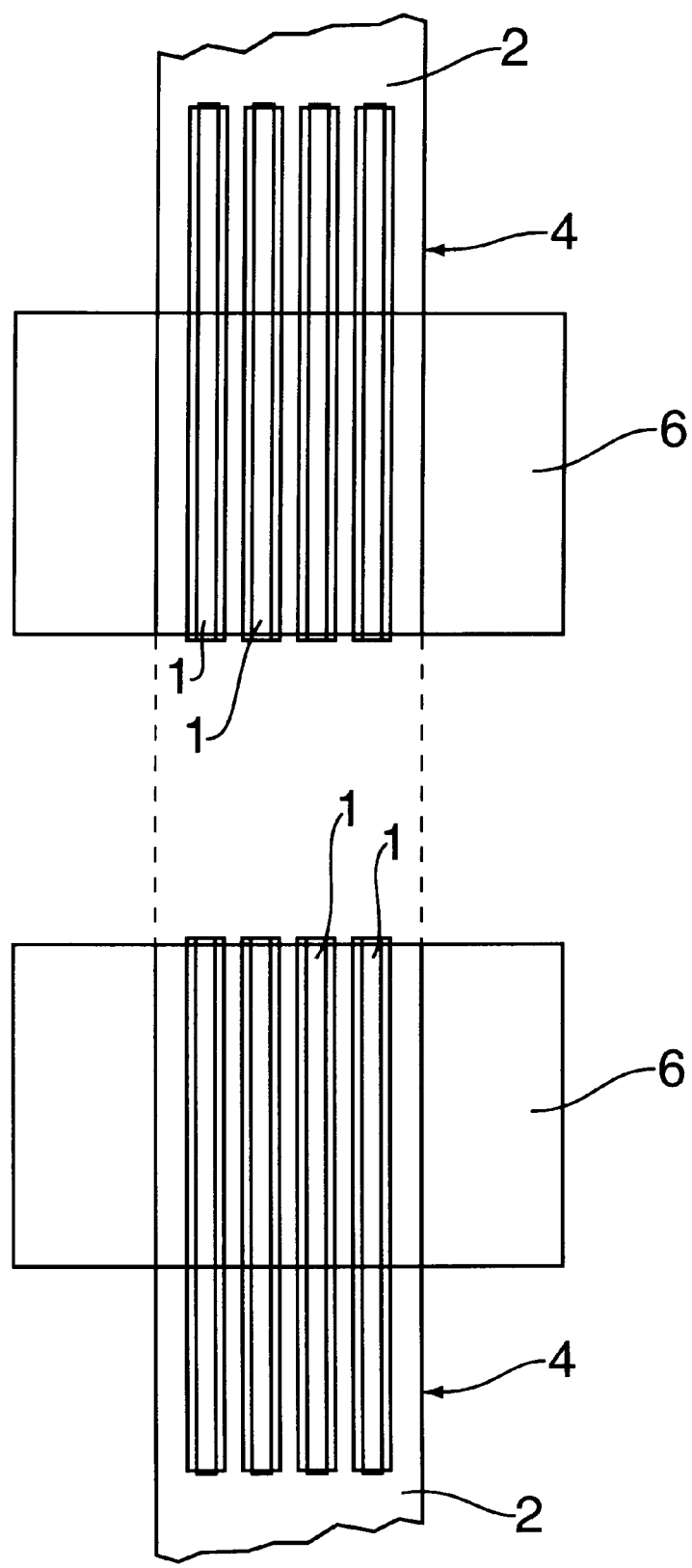
FIG. 5 shows two waveguide ribbons attached to two connectors and the two connectors in proximity to each other prior to being attached together.

In yet another embodiment of the invention, a waveguide assembly can be fixed in a bench and cover and attached to a corresponding second waveguide assembly in a second bench and cover. As shown in FIG. 5, a first waveguide assembly can be fixed within a first bench and cover and a second waveguide assembly or an array of optical fibers can be fixed within a second bench and cover. Thereafter the first and second bench and cover combinations are attached to one another by physically mating the two bench and cover assemblies, such that the waveguide ends are aligned. FIGS. 2(a) and 2(b) show a first waveguide assembly fixed within a first bench and cover and an array of optical fibers can be fixed within a second bench and cover. The fiber may also have a buffer coating material, for example an acrylic or polyimide. If the corresponding benches of both connector halves are aligned upon mating, then the vertical alignment of the light conducting waveguides is ensured by the appropriate choice of plateau height. The alignment of one optical bench to the other within the connector can be achieved by a variety of means. One preferred method is to use pins or rails to engage outer grooves formed by the sloping wall of the bench and the bottom surface of the top cover of the alignment fixture. The two connectors may either be permanently mated or may be de-mateable. The co-linear (co-axial) alignment of the corresponding waveguides and/or fibers in the assembled connector is critical. It is also critical that the end faces of the waveguides in the two connector halves be in close proximity when the connector is mated to accomplish this requirement. It is critical that the waveguide ribbon be inserted in its corresponding alignment fixture to a depth such that the end face of the waveguide core is flush to the end of the alignment element. The core and the end face of the alignment element for multimode applications are preferably flush to within 10 microns and more preferably flush to within 5 microns, and for single mode applications are flush to within 3 microns and more preferably to within 1 micron. This condition may be accomplished by accurate insertion using visual inspection means, or it may be accomplished by inserting the ribbon so that it protrudes by a small amount, and then cutting or polishing the ribbon back to the level of the end face of the alignment fixture (the bench and its cover).

Figure 3A:
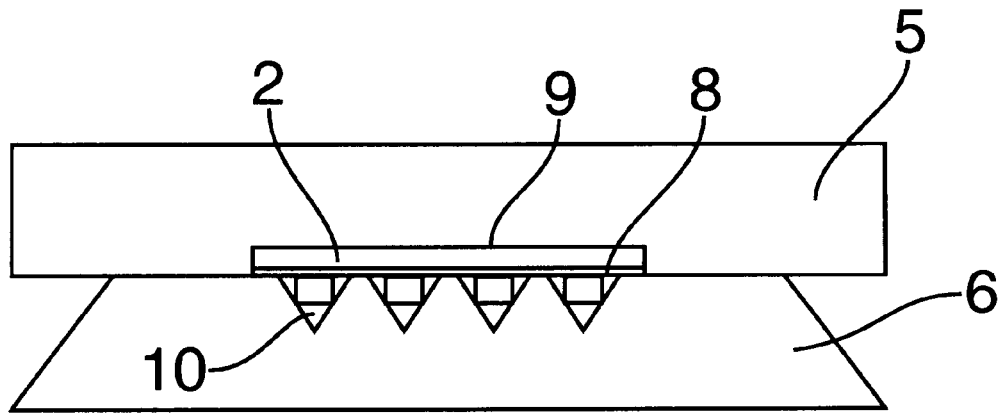
FIG. 3(a) shows one embodiment of a waveguide ribbon with a uniform buffer layer underlying waveguides and the ribbon inserted into a connector alignment fixture.
Figure 3B:
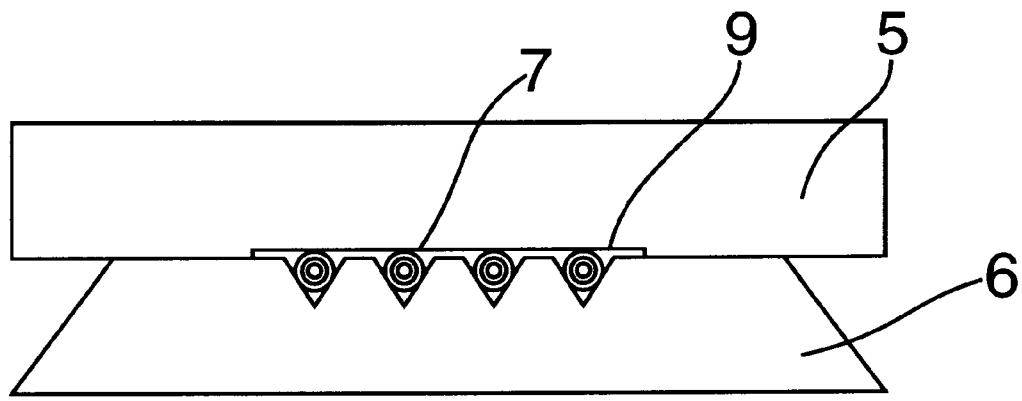
FIG. 3(b) shows another embodiment of a waveguide ribbon inserted into a connector alignment fixture.
Figure 4A:
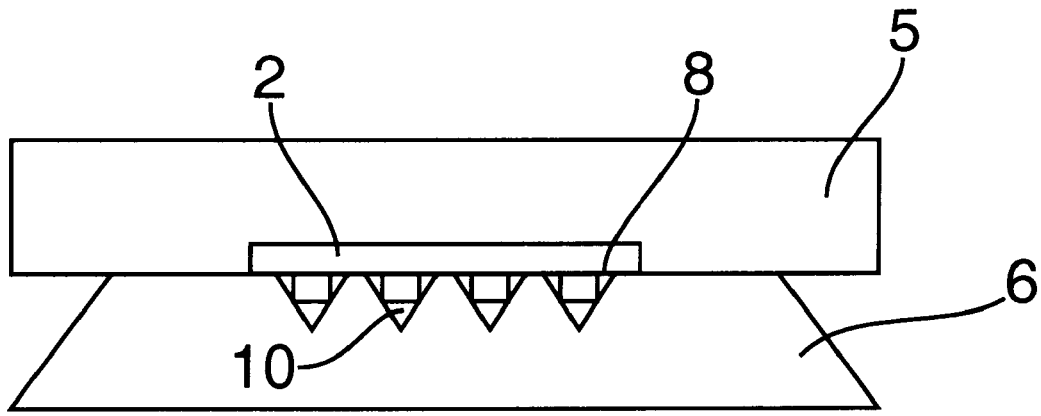
FIG. 4(a) shows one embodiment of a waveguide ribbon with a uniform buffer layer underlying waveguides and the ribbon inserted into another connector alignment fixture.
Figure 4B:
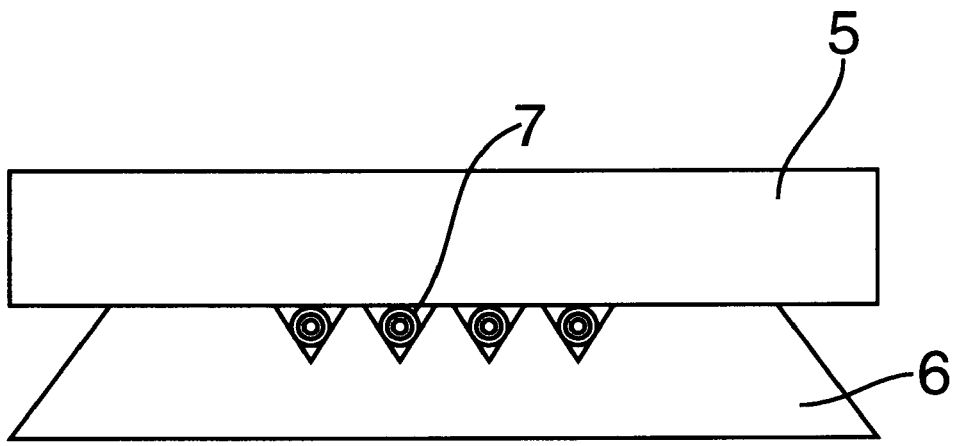
FIG. 4(b) shows another embodiment of a waveguide ribbon inserted into another connector alignment fixture.

As shown in FIG. 2(a), each waveguide is provided with a discrete plateau 3. For manufacturing simplicity and lower cost, it is generally desirable to adopt a design which eliminates the plateau from the structure in favor of a uniformly thick underlayer or buffer coating, 8 as shown in FIGS. 3(a) and 4(a). The purpose of the discrete plateau structure is to compensate for the thickness of the cladding and optional jacketing on a glass or polymer fiber 7 having a round or elliptical cross-section. When a direct waveguide to waveguide interconnection is desired within a de-mateable connector, the plateau layer can be eliminated. An alternative alignment scheme can also be adopted for a connector designed to interface ribbed polymer waveguides with clad or jacketed glass or polymer fiber. If the plateau layer is eliminated, either the position of the fibers can be adjusted by making the grooves in the optical bench less deep and slotting the cover plate as shown in FIG. 3(b), or the relative alignment of the optical benches within the two connector halves can be offset by an amount to compensate for the thickness of the fiber as shown in FIG. 4(b). This scheme allows for the use of a simpler construction for the ribbed waveguide without need for a discrete plateau, which in turn eliminates a costly manufacturing step. In this case lateral alignment is accomplished by the waveguides contacting the walls of the grooves in the bench.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLE 1

A quantity of alignment fixtures were prepared which consisted of a grooved silicon wafer section (herein referred to as a silicon optical bench, element 6 in FIG. 2(a), and a glass cover plate (element 5 in FIG. 2(a)). A roughly rectangular channel with a cross section of about 2 mm by about 0.127 mm was ground into the glass cover plate and the ground side of the plate was bonded directly onto the grooved side of the silicon bench to form a grooved channel running the full length of the piece. The grooves were made deeper along one edge of the silicon in order to facilitate the insertion of a waveguide ribbon strip. The dimensions of the channel at the other end of the strip are critical to achieving alignment of the light guiding cores of the waveguide and were measured to give the results in Table 1.

TABLE 1

Dimensions of Alignment Fixtures in $\mu$m

|  | S* | D* | W | r | L |
|---|---|---|---|---|---|
| Target Specifications: | >127 | 247 | 350 | 0 | 225 |
| Sample #, Channel # |  |  |  |  |  |
| 1,1 |  |  | 230 | 354 | 29 |
| 1,2 |  | 128 | 252 | 351 |  |
| 1,4 |  | 125 | 240 |  |  |
| 2,1 |  | 132.5 | 246 |  | 191 |
| 2,2 |  | 134 |  |  |  |
| 2,4 |  | 131 |  | 24 | 260 |
| 3,1 |  | 127 | 245 |  | 23 |
| 3,3 |  | 127 | 244 |  |  |
| 3,4 |  | 129 | 242 |  | 31 |
| 4,1 |  | 136 | 245 | 347 | 25 | 140 |
| 4,4 |  | 137 | 240 |  |  | 283 |
| 5,1 |  | 131 | 243 |  |  | 185 |
| 5,4 |  | 134 | 246 | 350 | 39 | 276 |

*Glass-Si interface used to establish zero reference for measurement.

In Table 1, S=slot height, D=Groove depth, W=groove width, r=radius of slot edge in glass, L=distance from nearest groove edge to edge of slot. Dimension r and L are not critical and are seen to vary widely. The critical dimensions, s, d, w, are held in close tolerance.

EXAMPLE 2

A waveguide ribbon was prepared on a 127-$\mu$m thick polyimide film substrate. The ribbon consisted of four parallel guides on 400-$\mu$m centers which were centered on four plateaus. The guides were produced from a transparent photo-polymerized acrylate polymer. The fabrication process required the fabrication of two layers on the polyimide substrate. The substrate film was first laminated to a glass slide using a low-adhesive-strength pressure sensitive adhesive (PSA). The first layer (the plateau) was built by exposing an approximately 39-micron-thick layer of monomer through a mask designed to produce the required plateau structure (4 parallel lines of 288-$\mu$m width). After development of the first layer by washing away unexposed monomer with acetone, the second layer was produced from a monomer layer which was approximately 131 $\mu$m thick (measured with respect to the surface of the substrate). This core layer was produced from a second mask which was precisely aligned with the already printed plateau structure. The polyimide film substrate containing the printed structures was then peeled from the glass slide and was cut to an appropriate width (less than 2 mm, the slot width dimension in Example 1) to ensure that the polyimide film edges would not control or interfere with the accurate alignment of the ribbon inside the fixture of Example 1. The final waveguide ribbon was configured as depicted in FIG. 1. Measurement of the dimensions of the structure with the aid of a microscope gave the following results:

TABLE 2

| Parameter | Measured ($\mu$m) | Target ($\mu$m) | Mask Feature Dimension ($\mu$m) |
|---|---|---|---|
| WG Height | 126 | 131 | — |
| Plateau Height | 39 | 39 | — |
| WG Width | 90 | 92 | 100 |
| Plateau Width | 288 | <287 | 288 |

EXAMPLE 3

The waveguide ribbon of Example 2 was inserted into the alignment fixture of Example 1. The fit was found to be tight with no observable play. The waveguide core was found to be in the appropriate position with respect to the alignment surfaces of the silicon optical bench. It was observed that the ribbon could be removed and re-inserted several times without damage.

What is claimed is:

1. A waveguide connector assembly which comprises
   (a) a base having a plurality of substantially parallel triangular channels defined by walls cut along a surface of the base;
   (b) a flexible waveguide assembly which comprises a substrate, a plurality of plateaus positioned on said substrate, and a plurality of substantially transparent, polymeric waveguides attached on the plateaus, said waveguides having a polygonal cross section defined by a plurality of flat edges; the waveguide assembly being positioned on the base such that each of the waveguides is positioned in one of the channels and contacts the walls of the channel at two or more points;
   (c) a cover plate on the waveguide assembly.

2. The waveguide connector assembly of claim 1 wherein the polygonal cross section has the shape of a rectangle or trapezoid.

3. The waveguide connector assembly of claim 1 wherein the plurality of waveguides on the substrate are substantially parallel to one another.

4. The waveguide connector assembly of claim 1 wherein the base and the cover plate are fixed together.

5. The waveguide connector assembly of claim 1 wherein the base and the cover plate comprise materials selected from the group consisting of glass and silicon.

6. The waveguide connector assembly of claim 1 wherein the base and the cover plate are a single piece monolithic construction and comprises a polymeric material.

7. The waveguide connector assembly of claim 1 further comprising a plurality of plateaus, one plateau positioned between each waveguide and the substrate.

8. The waveguide connector assembly of claim 7 wherein each plateau is positioned in one of the channels and contacts the walls of the channel.

9. The waveguide connector assembly of claim 1 wherein the substrate is positioned in a slot in a surface of the cover plate.

10. The waveguide connector assembly of claim 1 further comprising a plurality of optical fibers positioned on the base such that an optical fiber is positioned in each of the channels and contacts the walls of the channel; the waveguide assembly and the optical fibers being positioned such that each of the waveguides is aligned and in juxtaposition with one of the optical fibers.

11. The waveguide connector assembly of claim 1 further comprising a second waveguide assembly, the second waveguide assembly comprising a second substrate, and a plurality of substantially transparent, polymeric second waveguides attached on and raised from a surface of the second substrate, said second waveguides having a polygonal cross section defined by a plurality of flat edges; the second waveguide assembly being positioned on the base such that each of the second waveguides is positioned in one of the channels and contacts the walls of the channel; the waveguide assembly and the second waveguide assembly being positioned such that each of the waveguides is aligned and in juxtaposition with one of the second waveguides.

12. The waveguide connector assembly of claim 11 wherein each of the waveguides is contacted with one of the second waveguides.

13. The waveguide connector assembly of claim 11 wherein each of the waveguides and the second waveguides have substantially the same cross section.

14. The waveguide connector assembly of claim 11 further comprising a plateau between each second waveguide and the second substrate.

15. The waveguide connector assembly of claim 11 further comprising a plurality of plateaus, one plateau positioned between each second waveguide and the second substrate.

16. The waveguide connector assembly of claim 15 wherein each plateau is positioned in one of the channels and contacts the walls of the channel.

17. The waveguide connector assembly of claim 11 wherein the second substrate is positioned in a slot in a surface of the cover plate.

18. The waveguide connector assembly of claim 11 wherein the polygonal cross section of each of the waveguides and the second waveguides has the shape of a triangle, rectangle or trapezoid; wherein the waveguide assembly and second waveguide assembly are flexible; wherein the plurality of waveguides on the substrate are substantially parallel to one another and the plurality of second waveguides on the second substrate are substantially parallel to one another; wherein the base and the cover plate are fixed together and the base and the cover plate comprise materials selected from the group consisting of glass and silicon.

19. The waveguide connector assembly of claim 18 further comprising a plateau between each waveguide and the substrate and a plateau between each second waveguide and the second substrate.

20. The waveguide connector assembly of claim 18 further comprising a plurality of plateaus, one plateau positioned between each waveguide and the substrate and one plateau positioned between each second waveguide and the second substrate.

21. The waveguide connector assembly of claim 20 wherein each plateau is positioned in one of the triangular channels and contacts the walls of the channel.

22. The waveguide connector assembly of claim 18 wherein the substrate and the second substrate are positioned in a slot in a surface of the cover plate.

23. A method for aligning a first waveguide assembly to a second waveguide assembly which comprises (a) providing a waveguide connector comprising a base having a plurality of substantially parallel channels defined by walls cut along a surface of the base and a cover plate on the base over the channels;

(b) providing first and second waveguide assemblies, each of which comprises a substrate, and a plurality of substantially transparent, polymeric waveguides attached on and raised from a surface of the substrate, said waveguides having a polygonal cross section defined by a plurality of flat edges;

(c) positioning the first and second waveguide assemblies on the base such that each of the waveguides is positioned in one of the channels and contacts the opposing walls of the channel at two or more points, and such that each of the waveguides on the first waveguide assembly has an end which is aligned with a corresponding end of a waveguide on the second waveguide assembly.

24. The method of claim 23 comprising covering the ends of the waveguide assemblies, the base and the channels with a flat cover plate after positioning the ends of the waveguide assemblies in the channels.

25. The method of claim 23 wherein the waveguide connector comprises a monolithic base and cover plate having a plurality of substantially parallel channels defined by walls cut therethrough and the method comprises sliding the ends of the waveguide assemblies into the channels.

26. A method for aligning a waveguide assembly to an optical fiber assembly which comprises (a) providing a waveguide connector comprising a base having a plurality of substantially parallel channels defined by walls cut along a surface of the base and a cover plate on the base over the channels;

(b) providing a waveguide assembly which comprises a substrate, and a plurality of substantially transparent, polymeric waveguides attached on and raised from a surface of the substrate, said waveguides having a polygonal cross section defined by a plurality of flat edges;

(c) providing an optical fiber assembly which comprises a plurality of attached optical fibers;

(d) positioning the waveguide assembly and the optical fiber assembly on the base such that each of the waveguides and optical fibers is positioned in one of the channels and contacts the opposing walls of the channel at two or more points, and such that each of the waveguides on the waveguide assembly has an end which is aligned with a corresponding end of an optical fiber on the optical fiber assembly.

27. The method of claim 26 comprising covering the ends of the waveguide assembly, the optical fibers, the base and the channels with a flat cover plate after positioning the ends of the waveguide assembly and optical fibers in the channels.

28. The method of claim 26 wherein the waveguide connector comprises a monolithic base and cover plate having a plurality of substantially parallel channels defined by walls cut therethrough and the method comprises sliding the ends of the waveguide assembly and optical fibers into the channels.

29. A method for aligning a first waveguide assembly to a second waveguide assembly which comprises (a) providing first and second waveguide connectors each comprising a base having a plurality of substantially parallel channels defined by walls cut along a surface of the base and a cover plate on the base over the channels;

(b) providing first and second waveguide assemblies, each of which comprises a substrate, and a plurality of substantially transparent, polymeric waveguides attached on and raised from a surface of the substrate, said waveguides having a polygonal cross section defined by a plurality of flat edges;

(c) positioning the first and second waveguide assemblies respectively on the base of the first and second waveguide connectors such that each of the waveguides is positioned in one of the channels and contacts the opposing walls of the channel at two or more points; and (d) attaching the first waveguide connector to the second waveguide connector such that each of the waveguides on the first waveguide assembly has an end which is in substantially co-linear alignment with a corresponding end of a waveguide on the second waveguide assembly.

30. A method for aligning a first waveguide assembly to a plurality of attached optical fibers, which optical fibers are attached to one another, which comprises (a) providing first and second waveguide connectors each comprising a base having a plurality of substantially parallel channels defined by walls cut along a surface of the base and a cover plate on the base over the channels;

(b) providing a waveguide assembly which comprises a substrate, and a plurality of substantially transparent, polymeric waveguides attached on and raised from a surface of the substrate, said waveguides having a polygonal cross section defined by a plurality of flat edges;

(c) providing an optical fiber assembly which comprises a plurality of attached optical fibers;

(d) positioning the waveguide assembly respectively on the base of the first waveguide connector such that each of the waveguides is positioned in one of the channels and contacts the opposing walls of the channel at two or more points;

(e) positioning the optical fiber assembly respectively on the base of the second waveguide connector such that each of the optical fibers is positioned in one of the channels and contacts the walls of the channel at two or more points; and (f) attaching the first waveguide connector to the second waveguide connector such that each of the waveguides on the waveguide assembly has an end which is in substantially co-linear alignment with a corresponding end of an optical fiber on the optical fiber assembly.

* * * * *